United States Patent [19]

Sakamoto et al.

[11] Patent Number: 4,521,473
[45] Date of Patent: Jun. 4, 1985

[54] CARPET WITH FUSION-CUT THROUGH BORE AND ITS MANUFACTURE METHOD

[75] Inventors: Takao Sakamoto; Tadafumi Abe, both of Akishima, Japan

[73] Assignee: Tachikawa Spring Co., Ltd., Japan

[21] Appl. No.: 544,413

[22] Filed: Oct. 21, 1983

[51] Int. Cl.³ .............................................. B32B 3/10
[52] U.S. Cl. ...................................... 428/82; 156/72; 156/251; 156/252; 156/253; 156/285; 428/85; 428/88; 428/91; 428/95; 428/96; 428/131; 428/134; 428/135; 428/136; 428/137
[58] Field of Search ...................... 428/82, 85, 88, 91, 428/95, 96, 131, 134, 135, 136, 137; 156/72, 251, 252, 253, 285

[56] References Cited

U.S. PATENT DOCUMENTS 3,703,424 11/1972 Charnock .............................. 428/88

Primary Examiner—Marion E. McCamish

Attorney, Agent, or Firm—Cushman, Darby & Cushman

[57] ABSTRACT

In a carpet having a through bore, the through bore is formed by fusion-cutting. A hem member is welded integrally to the areas of a napped portion and a base cloth at the circumferential edges of the through bore. This prevents the threads of the napped portion existing at the circumferential edges of the through bore from fraying and also keeps such areas from being stained with oil or the like. Also, a method of welding said hem member to said base cloth is disclosed which comprises: laminating a thermally weldable synthetic resin film for hemming on a carpet, punching out a through bore in the synthetic resin film by means of a high frequency wave, and at the same time welding the hem member integrally to the wall edges of said punched through-bore. The simultaneous operation—welding of the hem member and punching of the through bore—provides a carpet quite easy to form and less expensive.

9 Claims, 6 Drawing Figures

CARPET WITH FUSION-CUT THROUGH BORE AND ITS MANUFACTURE METHOD

BACKGROUND OF THE INVENTION

1. Field of the Invention

This invention generally relates to a carpet, and in particular to a floor carpet (for example, for vehicles such as a farm tractor) having a through bore through which an operating lever or the like is inserted and a method of manufacturing such a carpet.

2. Description of the Prior Art

Conventionally a floor carpet (A') to be spread on a vehicle floor, as shown in FIG. 1, is manufactured in such a manner that a through bore (a') is punched out at a suitable position in the carpet body by means of a press and the edge portions of the punched through bore are subjected to an overlock treatment (a'') (that is, sewing by an overlocking machine) so as to prevent threads at the through bore edges from fraying. With this prior art forming method, the edges of the through bore (a') show a fine aesthetic appearance due to the overlock treatment. However, the productivity of such a carpet is very poor and there is a possibility that sewn threads in the overlocked portions may be cut and frayed during a long period of use. There is further a possibility that the circumferential edges of the through bore may be stained by oil or the like attached to the operative lever and the like.

Thus, in view of the above-mentioned drawbacks of the conventional floor carpet (A'), it is an object of the present invention to provide an improved floor carpet which is advantageous in that the circumferential edges of a through bore cut in the carpet body will not be stained and also that such edges can be formed in a simple manner.

Other objects, features and advantages of this invention will be more apparent to those skilled in the art by referring in detail to this specification and appended claims.

SUMMARY OF THE INVENTION

In brief, the above-mentioned object as well as other objects, features and advantages of the present invention can be achieved in the following manner:

A through bore of a desired configuration is formed at a suitable position in a carpet body, and at the same time a hem member, which is formed of a thermally weldable (fusedly adherable) synthetic resin film integral with a base cloth, is welded (fused and adhered) along the wall of the through bore and also over a napped portion formed along the circumferential edges of the through bore.

Since both of the base cloth and hem member are formed of a thermally weldable material, they can be adhered to each other integrally so that the hem member will not peel off from the welded portion. A film for the hem member is formed by first cutting a stock to produce a doughnut-shaped blank and then welding this doughnut-shaped blank to the base cloth by means of a heat press.

Also, a high-frequency welding machine may be used to weld the hem member to the base cloth simultaneously with the formation of the through-bore. In this case, the size of the thermally weldable film used for the hem member must be substantially the same as that of the base cloth.

If the film for hemming has a color different from the coloring of the napped portion, a decorative carpet having a fine aesthetic appearance can be obtained.

BRIEF DESCRIPTION OF THE DRAWINGS

The above object as well as other objects, features and advantages of the present invention will be more fully apparent to those of ordinary skill in the art to which this invention pertains from the following detailed description, when considered in connection with the accompanying drawings, in which like reference characters designate like or corresponding parts throughout the several views, and wherein.

DETAILED DESCRIPTION OF THE PREFERRED EMBODIMENT

Figure 1:
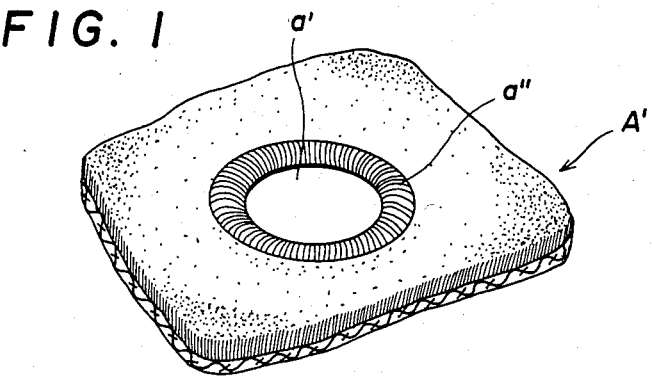
FIG. 1 is a perspective view of a part of a conventional floor carpet.
Figure 3:
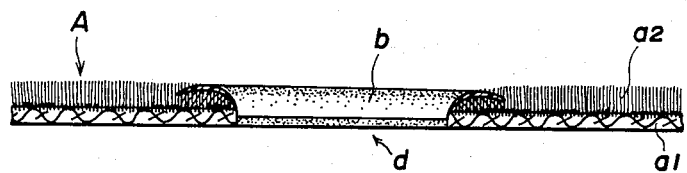
FIG. 3 is a vertical sectional view taken along a line X—X in FIG. 2.
Figure 2:
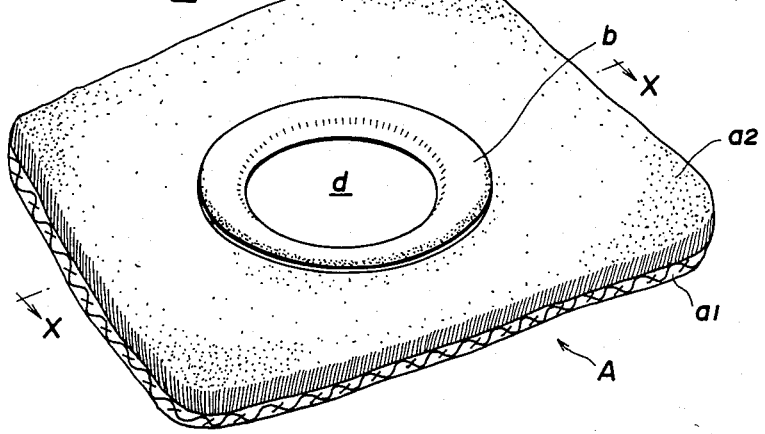
FIG. 2 is a partially enlarged perspective view of an embodiment of the present invention.
Figure 4:
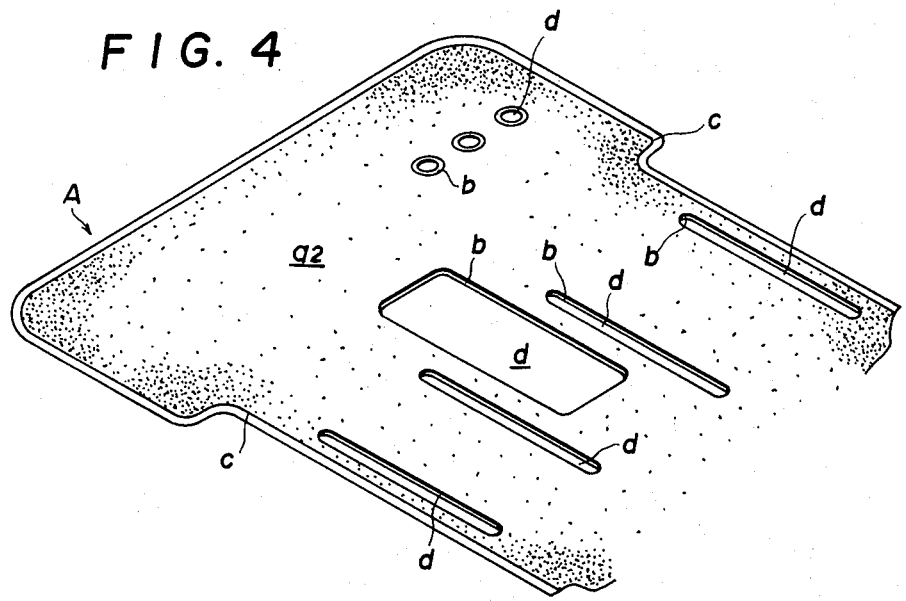
FIG. 4 is a perspective view of the embodiment of the present invention shown in FIG. 2; and, FIGS. 5 and 6 are respectively vertical sectional views of the embodiment of the present invention, illustrating how to manufacture the carpet.

FIGS. 2-4 illustrate an embodiment of a carpet according to the present invention, and in particular FIGS. 2 and 3 each are an enlarged view of a part of the embodiment of the present invention.

Throughout these figures, (A) designates a carpet body which comprises a base cloth ($a_1$) formed of a coating member and a napped portion ($a_2$) provided on the base cloth, and, in particular, the base cloth ($a_1$) is a coating member formed of a thermally weldable synthetic resin such as polyethylene and the rear surface of the napped portion ($a_2$) is coated with the coating member.

The napped portion ($a_2$) shown is formed by napping polypropylene or the like by means of a needle punch, but it may also be produced by grafting a natural fiber onto the base cloth ($a_1$) using an adhesive or the like.

In FIGS. 2, 3 and 4, (d) represents a through bore through which an operator lever or the like can be inserted, and, as shown in FIG. 4, this through bore is formed at a suitable position in the carpet body (A) by a high-frequency welding machine or the like such that it has a desired shape. Simultaneously with the formation of this through bore (d), a hem member (b) is welded to the circumferential edges of the bore (d), which prevents sewn threads in the napped portion ($a_2$) from fraying when the through bore (d) is being formed.

The hem member (b) is a thermally weldable synthetic resin film such as a vinyl-chloride film, which is integrally welded at its one end to the base cloth ($a_1$) and is also welded over a range from the wall of the through bore (d) to the napped portion ($a_2$) provided at the peripheral portions of the through bore. If the hem member (b) used is formed of a film having a color different from that of the napped portion ($a_2$), then the resultant carpet will have a fine aesthetic appearance.

Figure 5:
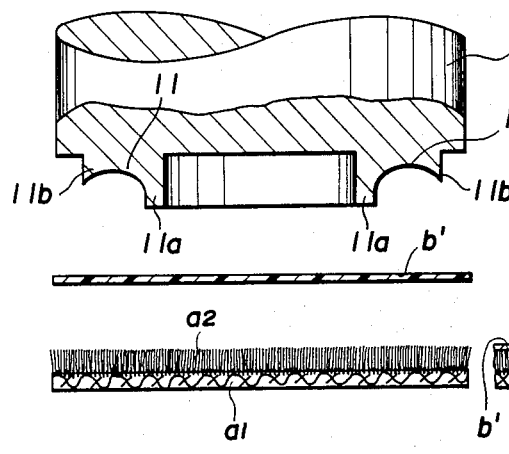
Figure 6:
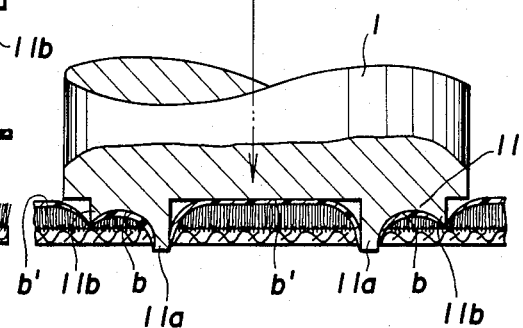

FIGS. 5 and 6 respectively illustrate the manner in which the hem member (b) is welded. A film (b') for hemming, which is formed of a thermally weldable synthetic resin film such as a vinyl chloride film having a size substantially equal to that of the carpet body (A), is laminated onto the carpet body (A) and then is positioned between an upper mold (1) (electrode) of a high-frequency welding machine and a lower mold (electrode) of the machine having a silicone mold thereon (FIG. 5). The upper mold (1) or lower mold is provided with ring-shaped (circular ring shaped, square ring shaped and so on), projected edges (11) for cutting a through bore in the carpet body.

Thereafter, when the upper mold (1) is lowered and a high frequency voltage is applied (FIG. 6), a base cloth ($a_1$) and a napped portion ($a_2$) are fused and cut along the projected edges (11) in a ring-like shape to form a through bore (d), and at the same time a hem member (b) is adhered along the edges of the wall of this through bore (d) (FIGS. 2 and 3). The above-mentioned projected edges (11) each comprise a cutter (11a) which fuses and cuts the carpet body (A) and a second cutter (11b) for fusedly cutting the film for hemming. In synchronization with the formation of the through bore (d), a hem portion (c) is provided by adhesion along the outer periphery edges of the carpet body (A).

Although in the illustrated embodiment the hem member (b) is formed by using a film (b') for hemming having a size substantially equal to that of the carpet body, it may also possible to employ a hemming film (b') that has been previously cut in a predetermined shape, that is, is slightly larger in size than the through bore. This alternative method can eliminate the need for the cutter (11b) which fusingly cuts a hemming film in the upper mold (1).

Due to the above mentioned arrangement, the present invention has the following advantages:

(1) Since a hemming member is welded onto the edges of the through bore as well as onto the napped portion along the circumferential edges of the through bore, the fraying phenomena along the through bore areas which have been a problem in the prior art can be completely prevented.

(2) As the hem member is welded integrally to the base cloth, there is no longer the possibility that the hem member peels off from the carpet body.

(3) Since the hem member consists of a synthetic resin film, there is no possibility that the carpet may be stained by water, oil or the like attached to the operative lever for insertion through the through bore.

(4) As the hem member can be welded at the same time when the through bore is formed in the carpet, it is substantially easier to attach the hem member and the resultant capret is much better in workability, when compared with the conventional manufacturing method.

From the foregoing description, one skilled in the art can easily ascertain the essential characteristics of this invention, and, without departing from the spirit and scope thereof, can make various changes and modifications of the present invention to adapt it to various usages and conditions.

What is claimed is:

1. A carpet comprising:
   a napped portion including a thermally weldable base cloth provided on a rear surface of the napped portion;
   a through bore having a desired shape and formed at a suitable position in the carpet, said through bore being defined by a wall which establishes a circumferential edge portion of said napped portion adjacent said wall; and
   a hem member consisting essentially of a thermally weldable synthetic resin film having first and second portions integrally adhered to said base cloth along said wall of said through bore and covering said circumferential edge portion of said napped portion adjacent to said wall of said through bore, respectively.

2. The carpet as recited in claim 1, wherein said base cloth comprises a coating member which coats the rear surface of said napped portion.

3. The carpet as recited in claim 1, wherein said napped portion is formed of polypropylene or other similar materials by means of a needle punch, or is formed by grafting a natural fiber onto said base cloth using an adhesive.

4. The carpet as recited in claim 1, wherein said hem member has a color different from that of said napped portion.

5. A method of forming a carpet comprising the steps of:
   (a) laminating a thermally weldable synthetic resin film on the surface of a carpet body having a base cloth of a thermally weldable synthetic resin layer on the rear surface of a napped portion;
   (b) positioning said laminated weldable synthetic resin film between upper and lower molds each including a high frequency electrode;
   (c) cutting the carpet body at a desired position by means of projected edges comprising cutters on one of said upper and lower molds to form a through bore having a wall to define a predetermined shape and to establish a circumferential edge of the napped portion adjacent to the wall; and
   (d) applying pressure and a high frequency voltage concurrently onto said weldable synthetic resin film by means of said upper and lower molds to thereby fuse said laminated synthetic resin film to said wall and to said circumferential edge of the napped portion adjacent to the wall.

6. The method of forming a carpet as recited in claim 5, wherein said upper and lower molds of high frequency electrodes each consist of ring-shaped projected cutters, said projected cutters comprising a first cutter which serves to cut a through bore and a second cutter for fusion-cutting a hemming film.

7. The method of forming a carpet as recited in claim 5 wherein at least one of said upper and lower molds includes ring-shaped cutting means having a first cutter to fuse and cut the synthetic resin film and the carpet body so as to form the through bore, and a second cutter for fusion-cutting a hemming portion of the film, wherein cutting the through bore and the hemming portion are accomplished simultaneously.

8. A method of forming a carpet having hemmed apertures comprising the steps of:
   (a) selecting a carpet body of the type having a thermally-weldable base and a napped surface;
   (b) positioning a synthetic resin film in confronting relationship to said napped surface portion at a desired position in which an aperture is to be formed in said carpet body;
   (c) cutting the film and the carpet body at said desired position to form an aperture of predetermined shape having a wall and establishing a circumferential edge portion of said napped surface adjacent to said wall; and
   (d) thermally welding said film to said aperture wall and to said circumferential edge portion of said napped surface to thereby provide said aperture with a hem of said film.

9. A method as in claim 8 wherein steps (c) and (d) are practiced simultaneously.

* * * * *